United States Patent [19]

Sullivan et al.

[11] Patent Number: 4,707,781
[45] Date of Patent: Nov. 17, 1987

[54] SHARED MEMORY COMPUTER METHOD AND APPARATUS

[75] Inventors: Herbert W. Sullivan; Leonard A. Cohn, both of New York, N.Y.

[73] Assignee: Chopp Computer Corp., La Jolla, Calif.

[21] Appl. No.: 673,159

[22] Filed: Nov. 19, 1984

Related U.S. Application Data

[60] Division of Ser. No. 254,583, Apr. 15, 1981, Pat. No. 4,484,262, which is a continuation of Ser. No. 2,004, Jan. 9, 1979, abandoned.

[51] Int. Cl.[4] .............................................. G06F 13/00
[52] U.S. Cl. .................................................... 364/200
[58] Field of Search ... 364/200 MS File, 900 MS File; 365/189

[56] References Cited

U.S. PATENT DOCUMENTS

| | | | |
|---|---|---|---|
| 3,449,724 | 6/1969 | Boland et al. | 364/200 |
| 3,588,829 | 6/1971 | Boland | 364/200 |
| 3,670,309 | 6/1972 | Amdahl et al. | 364/200 |
| 3,685,020 | 8/1972 | Meade | 364/200 |
| 3,845,474 | 10/1974 | Lange | 364/200 |
| 3,896,419 | 7/1975 | Lange et al. | 364/200 |
| 3,964,054 | 6/1976 | Annunziata et al. | 364/200 |
| 4,077,059 | 2/1979 | Cordi et al. | 364/200 |
| 4,445,171 | 4/1984 | Neches | 364/200 |

OTHER PUBLICATIONS

"The Implementation of the Cm Multi-Microprocessor", written by Swan, AFIPS Conf. Proceedings, Jun. 13-16, 1977, 645-655.

Primary Examiner—Eddie P. Chan
Attorney, Agent, or Firm—Robin Blecker & Daley

[57] ABSTRACT

A shared memory computer method and apparatus having a plurality of sources, a memory manager, and memory units in which the memory locations of data items are randomly distributed. The memory manager includes a translation module for locating data items in the memory units and a temporary storage buffer for storing at least a portion of messages between sources and the memory units with respect to data items.

23 Claims, 20 Drawing Figures

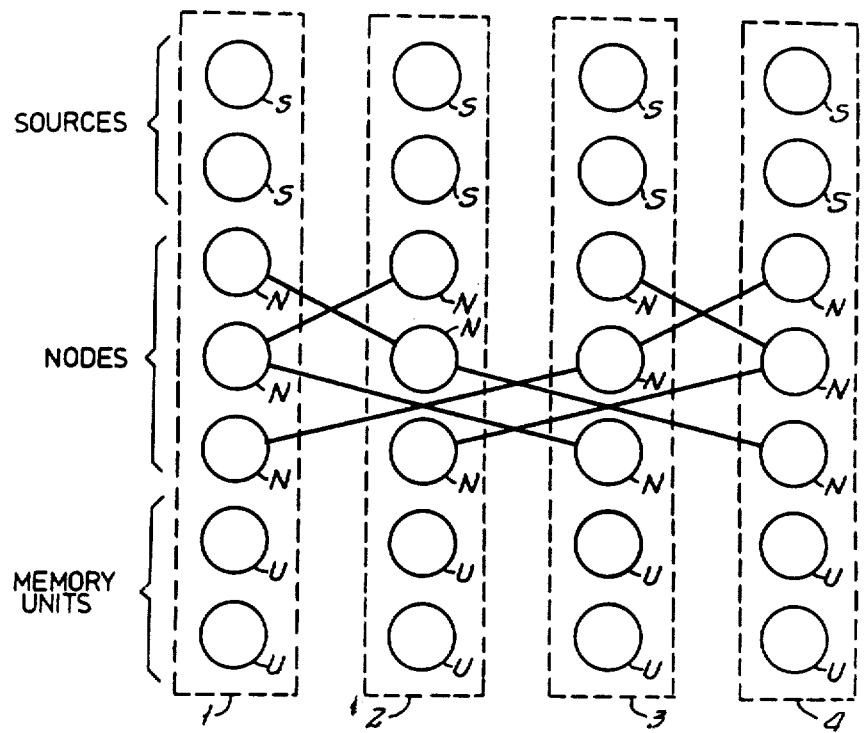
FIG. 13
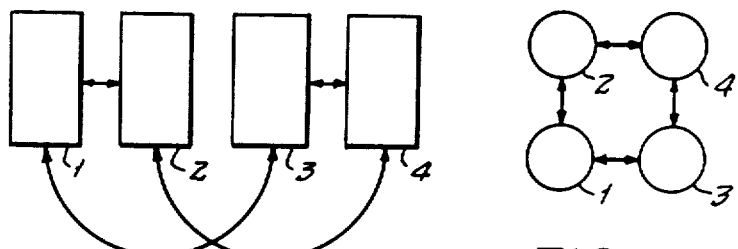
FIG. 14
FIG. 15
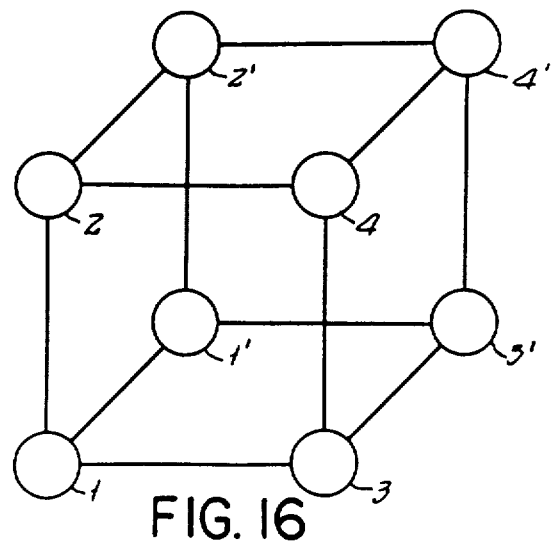
FIG. 16

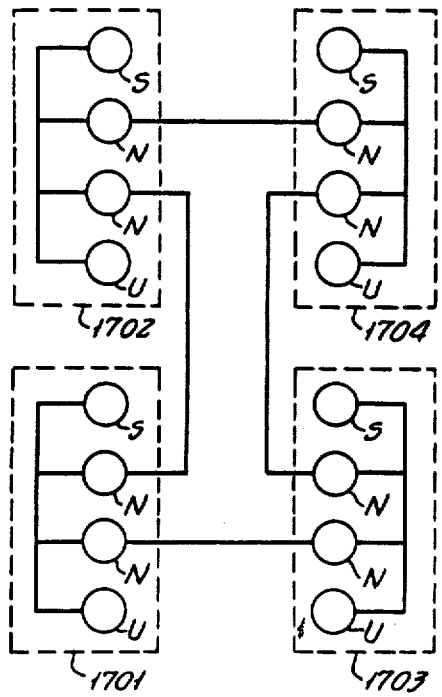 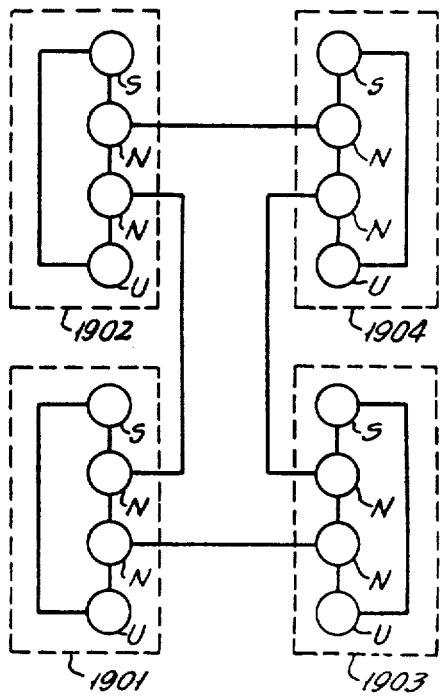
FIG. 17  FIG. 19
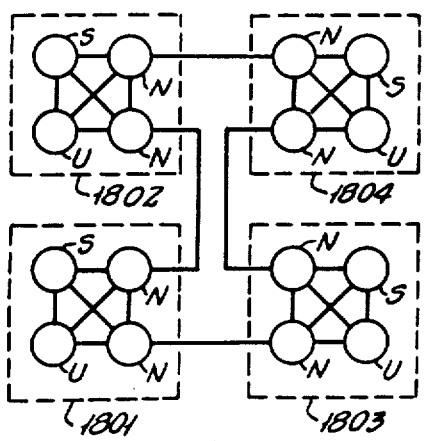 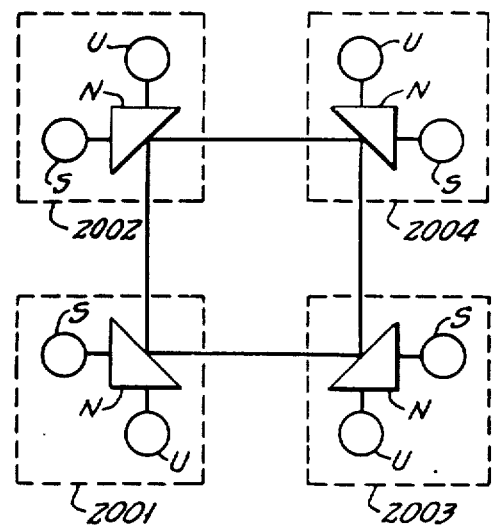
FIG. 18  FIG. 20

SHARED MEMORY COMPUTER METHOD AND APPARATUS

This application is a division of application Ser. No. 254,583, filed Apr. 15, 1981, now U.S. Pat. No. 4,484,262, which is a continuation of Ser. No. 002,004, filed Jan 9, 1979, now abandoned.

BACKGROUND OF INVENTION

It is often necessary or desireable in complex computer systems for a multiplicity of processing units to simultaneously access a shared memory, in order to manipulate a common body of data (a shared data base) by retrieving, storing, or modifying information. Examples of such systems include multiprogramming uses of conventional computers, single instruction multiple datastream (SIMD) computers and multiple instruction multiple datastream (MIMD) computers. In all present computer systems known to us, the number of processing elements which can perform such memory manipulation simultaneously is limited by the conflicts that occur in accessing the memory. For example, a single core or semi-conductor memory unit is usually so constructed that requests from sources to store, retrieve, or modify data items can only be accomodated one at a time, in some sequential order. Multiple requests to this single memory unit (containing a number of data items) must have a contention or conflict resolution mechanism that orders the requests in some sequence. Multiple units of memory can be used in order to reduce such conflicts but, in conventional systems, the total rate of references to memory by sources does not increase in proportion to the number of multiple memory units. There are no existing methods known to us, except for our invention described below, which achieve essentially conflict-free performance. By conflict-free we mean that the rate of references to the memory units can be increased in proportion to the increase in number of memory units with substantial independence of the memory referencing pattern.

SUMMARY OF INVENTION

Contrary to the usual organization of memory, one aspect of our invention is the assignment of data items to randomly selected memory locations. A translation or reference module is employed to locate the desired data item.

Another aspect of our invention is a temporary storage buffer in the memory management system which, in the preferred embodiments, not only stores data items recently retrieved from the main or peripheral memory but also stores requests to READ, WRITE or TEST data items while the main or peripheral memory is being accessed. This avoids duplicative requests to the main or peripheral memory not only for data items recently accessed but also for data items in the process of being accessed.

In some embodiments of our invention, temporary storage buffers are located in nodes of a memory management network, providing parallel access to a data base from a plurality of sources without the need for a synchronizing host computer.

Additional information concerning our invention and its background can be found in our following papers: H. Sullivan, et al, "A Large Scale, Homogeneous, Fully Distributed Parallel Machine, I & II," 4th Annual Symp. on Computer Architecture Proceedings, March 1977, pp. 105-124; H. Sullivan, et al, "The Node Kernel: Resource Management in a Self Organizing Parallel Processor", "High Level Language Constructs in a Self-Organizing Parallel Processor" (abstract) and "Parameters of CHoPP" (abstract), Proceedings of the 1977 International Conference on Parallel Processing, August 1977, pp. 157-164; and H. Sullivan, et al., "CHoPP: Interim Status Report 1977" (unpublished). Copies of these papers have been filed with this application.

Our invention can be embodied in memory systems consisting of a multiplicity of independent memory units, whether they be, for example, core or semiconductor or other random access memories or a collection of direct access memory units such as magnetic drum units, disk units, or sequential units such as magnetic tape units, etc.

Further features of our invention, its nature and various advantages will be more apparent upon consideration of the attached drawing and the following detailed description of the invention.

BRIEF DESCRIPTION OF THE DRAWINGS

In the drawings:

FIG. 13 is a further block diagram of the fourth embodiment of our invention;

FIG. 14 is the block diagram of FIG. 13 redrawn in terms of network modules;

FIG. 15 is the block diagram of the embodiment of FIG. 14 redrawn with the network modules arranged in a binary 2-cube, or square;

FIG. 16 is the block diagram of a further embodiment of our invention in which the embodiment of FIG. 14 has been duplicated and arranged in the form of a binary 3-cube, or cube;

FIG. 17 is the block diagram of a binary 2-cube embodiment of our invention having network modules internally connected by a bus;

FIG. 18 is the block diagram of a binary 2-cube embodiment of our invention having the network modules internally connected by a crossbar structure;

FIG. 19 is a block diagram of a binary 2-cube embodiment of our invention having the network modules internally connected in a ring structure; and FIG. 20 is a block diagram of a binary 2-cube embodiment of our invention having eneric network modules.

DESCRIPTION OF PREFERRED EMBODIMENTS

Figure 1:
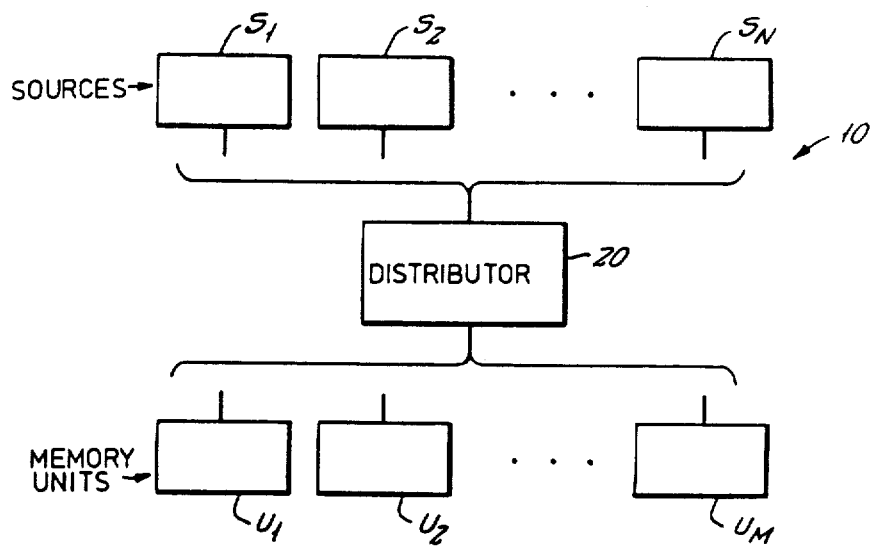
FIG. 1 is a block diagram of the overall structure of a shared memory computer system.

The overall structure of a shared memory computer system 10, which is helpful in understanding the background of our invention, is shown in FIG. 1. There are N sources $S_1$ through $S_N$, operating in parallel, which make memory requests. A memory reference is any reference to a data item in memory made by a source, such as a request to retrieve a data item from memory (READ) or to transmit a data item to memory for storage or modification of a data item already in storage (WRITE). The memory system holds a data base which is defined as any collection of data items, not necessarily related. A data item or item is any meaningful collection of symbols, e.g., bits, bytes, characters, numbers, words, records, instructions, computer programs. Each separate item exists in one and only one of the actual memory units $U_1-U_M$ within the memory system. There are many items in each actual memory unit $U_1-U_M$. The sources $S_1-S_N$ may be, for example, individual user terminals, separate computers or processors, portions of a multitask program, or combinations thereof. The total number of memory requests generated by the sources $S_1-S_N$ per unit time is R. On average, each source generates $R/N$ such requests per unit time.

A distributer 20 receives the requests from the sources $S_1-S_N$ and forwards each request to the appropriate one of the M memory units $U_1-U_M$. For example, if the request is a READ request from source $S_1$ for a data item stored in memory unit $U_2$, the memory manager 20 will return a copy of the data item to the source $S_1$. If the request is a WRITE request (which may be a request to either store or modify a data item), the memory manager 20 will cause the appropriate memory unit to perform the activity.

For the purpose of exposition, we assume a fixed access time which is the same for all the memory units, and use this as our time unit. In other words, in this discussion a memory unit takes one unit of time to make either a READ or a WRITE access. Our invention, however, is not so limited. We further assume that all of the M memory units $U_1-U_M$ can operate simultaneously and independently and that the total rate of memory references R is less than the total number of memory units M.

The following types of systems are illustrative of the types of systems contemplated in FIG. 1:

(1) A multiprogrammed or, more generally, a multitasking computer system. There are N tasks in the computer system. These tasks make memory references from time to time. The average total rate for all N tasks is R. There are M disk units on the system. The computer system, while executing the disk operating system, comprises the memory manager.

(2) There are N different terminals referencing a common data base through a high speed computer. The total referencing rate for all the terminals is R. There are M disk units in which the data base is stored. The communications "front end" (if any), the computer, channels, disk controllers, etc., comprises the memory manager.

(3) There are N processors, for example, independent computers, which share an internal high speed memory system. The total rate at which references are made is R. The memory system comprises M independent memory units. The memory manager comprises an electronic switching network connecting the processors to the memory units.

In all of these systems, the result sought is that the rate R of references to the memory units $U_1-U_M$ by the sources $S_1-S_N$ as a group can be proportional to the number M of memory units $U_1-U_M$. Since the referencing sources $S_1-S_N$ are assumed to be independent, there is no a priori reason why this should be the case in the absence of our invention. If, for example, as a result of some perverse referencing pattern, all the access requests were to arrive at a single memory unit, such as unit $U_2$, the maximum rate R could not be greater than one referene per unit time (the assumed speed of a single memory unit). Until recently it was feared that system referencing rates proportional to M could not be achieved in either theory or practice. See, for example, the review paper "On the Effective Bandwidth of Parallel Memories" by D. Y. Chang, D. J. Kuck and D. H. Lawrie in IEEE Transactions on Computers, p. 480 (May 1977).

The Chang et al article cited above notes a theoretical model proposed by C. V. Ravi in which the system rate R is indeed proportional to M as a result of a restrictive assumption that the referencing patterns of the sources is random, an assumption which would be unacceptable in practice.

Figure 2:
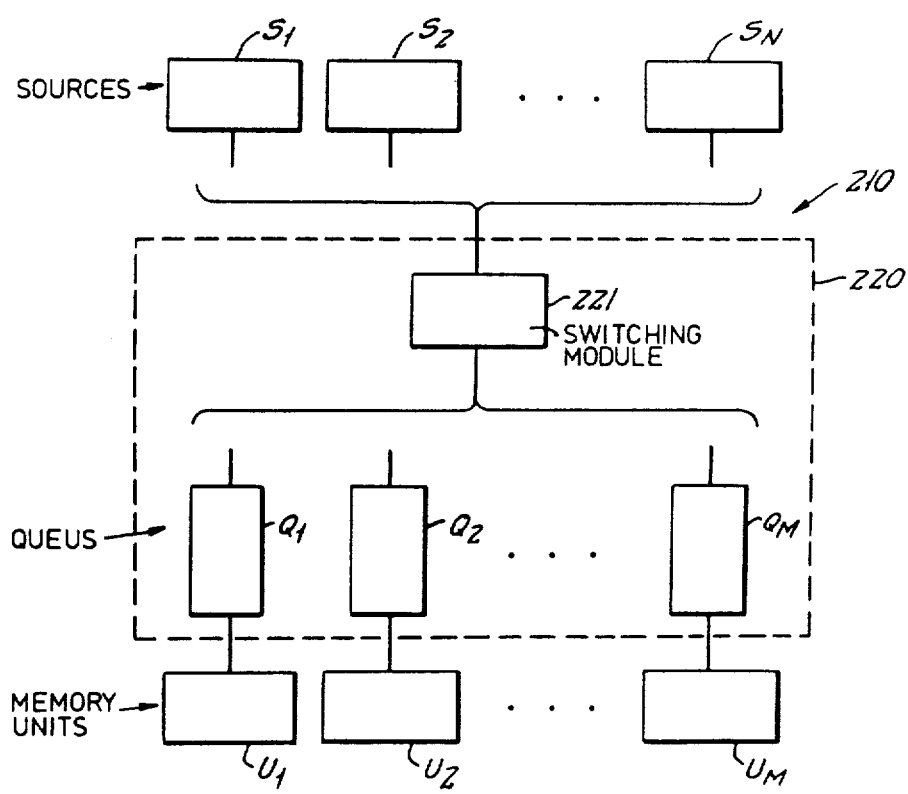
FIG. 2 is a block diagram of the structure of a shared memory computer system showing greater detail of the distributor than FIG. 1.

FIG. 2 shows a computer system 210 for the purpose of considering a system in which the sources have a random referencing pattern. The computer system comprises a plurality of sources $S_1-S_N$, a plurality of memory units $U_1-U_M$, and a distributor 220 including a switching module 221 and a plurality of queues $Q_1-Q_M$ for requests directed to the memory units $U_1-U_M$.

When we say that references are made by the sources $S_1-S_N$ to memory units $U_1-U_M$ are made at random, we mean: (1) that for any reference, the probability of accessing at any given one of the M memory units $U_1-U_M$ is just $1/M$ and (2) that references are statistically independent of each other. At each of the memory units $U_1-U_M$, a queue Q of access requests is maintained. The electronics to accomodate this queue may be thought of as being part of the switch element 220.

For purposes of analysis we need not specify in this example how many referencing sources are present because the reference pattern is fully defined.

Figure 3:
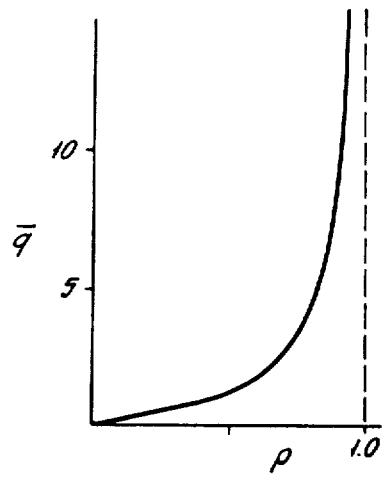
FIG. 3 is a utilization curve for shared memory computer systems.

Since arrival of access requests at any of the memory queues $Q_1-Q_M$ is independent of all other access request arrivals, we can analyze each of the memory units $U_1-U_M$ and its corresponding queue independently. The queueing behaviour is one of random arrivals and a fixed service time. It can be approximated by the so-called M/D/1 queue. (See, for example, Kleinrock, *Queueing Systems,* vol. I). The expected utilization $\rho$ of any of the memory units $U_1-U_M$ is determined by the average queue length $\bar{q}$ at that unit. (See FIG. 3). For memories having a fixed access time of one unit, if accesses are actually attempted at this rate, the queue length becomes infinite as shown in FIG. 3. If we access, however, at some fraction of this fixed rate, the queues are finite and the smaller the rate of access, the smaller the queues. Once a desired queue length is established, the throughput of each of the memory units $U_1-U_M$ will be some fixed fraction $\rho$ of requests per unit time. Therefore, the system rate R will be just $p$ times M, and thus proportional to the number M of memory units $U_1-U_M$. Of course the presence of queues causes some additional waiting time for requests to be served; but for modest mean queue lengths, the throughput rate R is a large fraction of M. Moreover, if smaller waiting times are desired, the rate R will be lower but still proportional to M. The decreased data rate may therefore be compensated by increasing M. Consequently the selection of the value of $p$ is a compromise among three factors: (1) the cost of additional memory units, (2) the cost of the queueing support hardware, and (3) the cost of waiting time.

The assumption of a pattern of random referencing by the sources may be superfically attractive, but is unrealistic in practical systems. In most practical systems, some of the data items are accessed much more often than others. Moreover, the effects of non-random access patterns are difficult to assess. As a result, the performance of the theoretical model mentioned above, which is noted by Chang et al., would be hard to predict and would probably be highly application dependent. Our invention permits the removal of the restriction of a random reference pattern by the sources. In accordance with our method and apparatus, the system has a certain guaranteed minimum performance independent of the referencing pattern.

Figure 4:
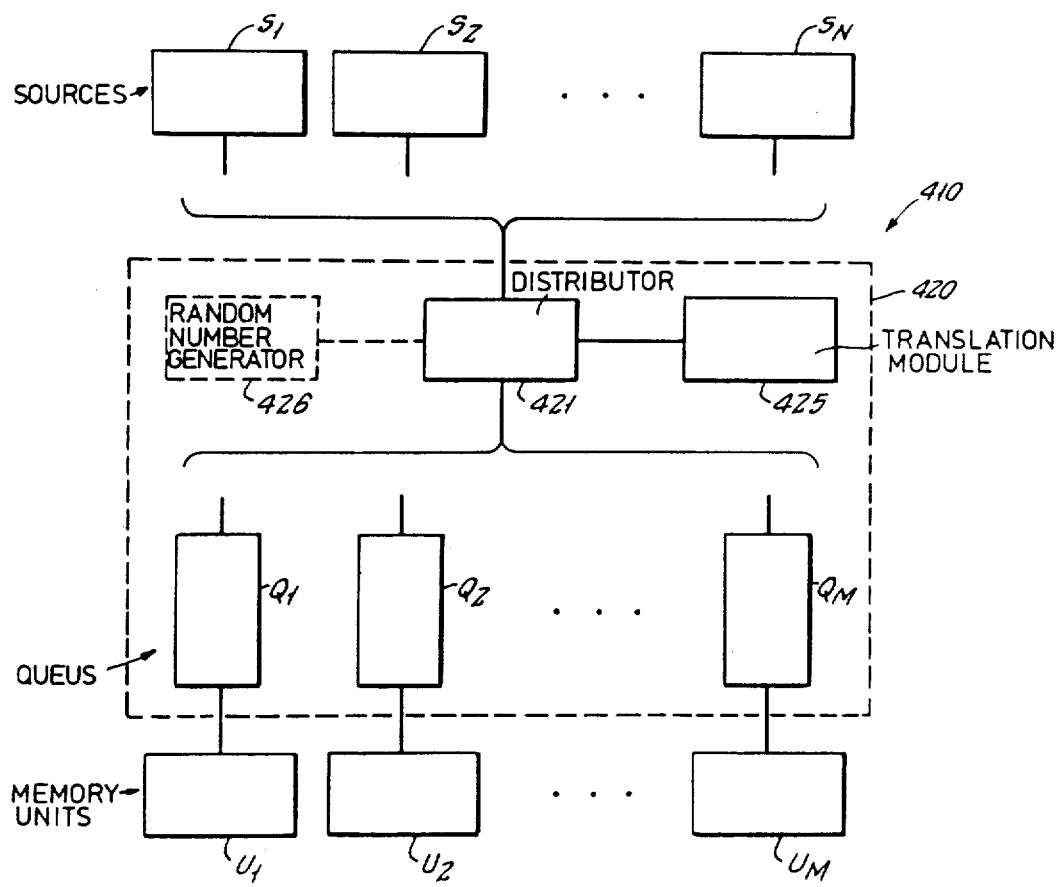
FIG. 4 is a block diagram of a first embodiment of our invention.

FIG. 4 shows a first embodiment of a computer system 410 in accordance with our invention. The computer system 410 includes a plurality of sources $S_1-S_N$, a memory manager 420, and a plurality of memory units $U_1-U_M$. The memory manager 420 includes a distributor 421 for performing switching functions, a translation module 425 and a plurality of queues $Q_1-Q_M$ for temporarily storing access requests en route to the memory units $U_1-U_M$. Although a separate queue is shown for each of the memory units $U_1-U_M$, shared queues can also be employed.

Items stored in the memory units $U_1-U_M$ may be accessed in the following ways:

READ reference. A request is sent from the source to read a data item in memory and return a copy to the source.

WRITE reference. A request is sent from the source to to modify a data item in the memory. The modification may depend both on the request and the current value of the data item. The simplest form of a WRITE reference request is a store operation, which replaces the current data item with a new data item.

TEST reference. A request is sent from the source to test the data item in the memory. Several different kinds of tests may be supported by the system. The nature of the test performed depends on the kind of request; but, in any case, there will be two possible outcomes of the test which can be called success and failure. In case of success, the data item in memory will be modified. In case of failure, the data item will not be modified. In either case, the requesting source will be informed of the outcome. A copy of the item may also be returned to the source.

Our memory manager 420 distinguishes between *references* to data items in the data base, made by the sources $S_1-S_N$, and *accesses* to data items in memory units $U_1-U_M$, made by the memory manager 420. This distinction reflects the fact that the sources $S_1-S_N$ make references to data items by means of some virtual address or symbolically in any convenient form. The data items are stored in memory locations within the memory units $U_1-U_M$. The memory manager 420 accesses data items in the memory units in accordance with the data items' actual location in memory. A random assignment of memory location is made whenever a new data item is created. A record of the translation from the virtual address to the actual address in which the data item is stored is kept in a translation module 425. Data references are translated by the memory manager 420. To do this, the memory manager 420 includes a translation module 425, such as a translation table or memory, which provides the correspondence between virtual and actual addresses. The memory manager 420 may also include a random or pseudo-random number generator 426, such as a random noise source together with an analog to digital converter, for use in creating a translation table in the translation module 425. Alternatively, the translation module 425 can contain a translation algorithm or an externally created translation table. The distinction between virtual and actual addresses plays an important role in the conflict control mechanisms of our invention. As will be seen in the detailed descriptions below, there need not be a one-to-one relationship between memory references and access requests in many embodiments of our invention.

We have said that the sources $S_1-S_N$ are independent, operating in parallel on a shared memory system. Certain WRITE referencing restrictions follow from this fact. These or similar restrictions are needed in any such parallel system to assure integrity of the data base. Our conflict control system exploits these restrictions.

WRITE requests are subdivided into two categories, private and shared, in accordance with the type of data they reference. Any of the sources $S_1-S_N$ may have private data, stored in the shared memory. This is data which that one source alone will reference. We impose no restrictions with respect to private data referencing. Certain data items are designated as shared, which means that they are potentially subject to modification by any of a number of different sources and also subject to READ requests by a number of different sources. Simultaneous writing by different sources of the same data item leads to indeterminate results, and consequently is unacceptable. Therefore, with respect to shared items, parallel systems inherently impose the restriction (to maintain the integrity of the data base) that no two of the sources $S_1-S_N$ will generate concurrent WRITE requests for the same shared data item. We are not concerned with enforcement of this restriction, but with providing a conflict free memory system in the presence of the restriction.

Under foregoing circumstances, the effect of randomization of the memory locations of data items is that of controlling conflicts for the case of WRITE operations. To test the effectiveness of randomized memory locations, we consider system behavior under a worst case referencing pattern. A worst case referencing pattern is one which causes the highest possible access rate to some one of the memory units $U_1-U_M$. It is a referencing pattern for which the highest possible proportion of total system references become accesses to one memory unit. The total system rate R must be adjusted so that the average access rate to any one of the memory units $U_1-U_M$ is less than one access per unit time. Otherwise the queue at that unit will build up indefinitely, and the system will fail to provide responses at the rate R. Therefore, the worst case reference pattern described above provides the minimum useful system rate.

To demonstrate the effect of randomization of the memory locations of data items under the worst case referencing pattern, we adopt the language of game theory. We assume that there is an Opponent, whose objective is to construct a referencing pattern which will "defeat" the computer system 410. By "defeat" we mean equalling or exceeding one memory access per unit time at the busiest memory unit when the system is operating at a rate R. The Opponent has full knowledge of the system's structure and its parameters (M, N and R). He has control of every reference made by all the sources $S_1-S_N$, in the sense that he can construct, in advance, any sequence of references. The Opponent does not know the specific contents of the translation module 425. Consequently, although he controls the reference addresses, he cannot know to which of the memory units $U_1-U_M$ a given reference will be directed. With all this knowledge, the objective of the Opponent is to use a referencing pattern which has the highest probability of overloading one of the memory units $U_1-U_M$. In other words, the Opponent will use that referencing pattern which has the highest probability of equalling or exceeding one memory access per unit time at the busiest memory unit when the system is operating at a rate R.

Does randomization of the memory location assignments in accordance with our invention avoid defeat by the Opponent? This depends on the value of N, the number of sources $S_1-S_N$. If N equals one, the Opponent would continuously reference the same private data item. He does not know which of the memory units $U_1-U_M$ will be accessed by this reference, but some one unit will certainly be accessed at the full rate R and the system will be defeated. (Under these circumstances the maximum rate R that the system can sustain is one reference per unit time; independent of M).

Suppose now that the number N of sources approaches infinity. The Opponent is then constrained to make WRITE accesses at random, independently, with equal probability at each memory unit. This constraint is based on the rule that only one source can send a WRITE request to a given address at one time. As a result, every address written by a different source, whether for a private or a shared data item, must be directed to a different address. Thus, the case where N approaches infinity is that previously considered: the case of a random access pattern.

Figure 5:
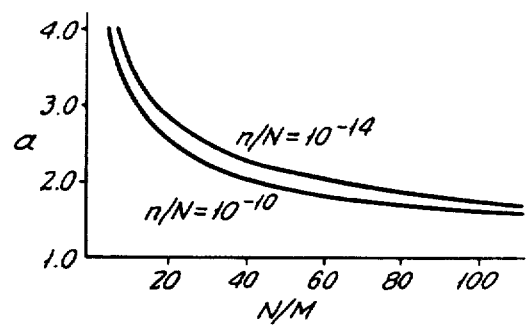
FIG. 5 is a memory access rate probability curve.

FIG. 5 shows the relationship between the number of sources $S_1-S_N$ and the memory access ratio. If the accesses to memory were distributed uniformily, then the access rate to each and every memory unit would be R/M. This is the expected access rate when the accesses are random and independent and corresponds to the case where $N = \infty$. For a finite number of sources, the relevant parameter is the ratio N/M, which is the number of sources per memory unit. When N/M is finite, there is a possibility that the arrival rate at some of the memory units will exceed the value R/M. We shall denote by x the rate of arrival at the busiest memory unit and shall define $\eta$ to be the probability that the rate x exceeds a fixed value $\alpha$. In other words $$\eta = PROB(x > \alpha)$$

Now FIG. 5 shows the relationship between $\eta$, $\alpha$, and N/M. The curve of FIG. 5 was derived from statistical analysis.

As FIG. 5 illustrates, the probability $\eta$ that the busiest memory will be accessed at high rate, can be made small by selecting N/M to be sufficiently large. Therefore, under worst case conditions, the memory system which we have invented will provide conflict free behavior with a high probability, provided the following conditions are met: (1) the system is utilized at a rate somewhat less than the absolute theoretical maximum. (i.e., less than M memory accesses per unit time). The amount by which the request rate must be decreased is given by $\alpha$, and (2) there are enough independent sources operating in parallel. The required number is determined from the value of N/M in FIG. 5.

Figure 6:
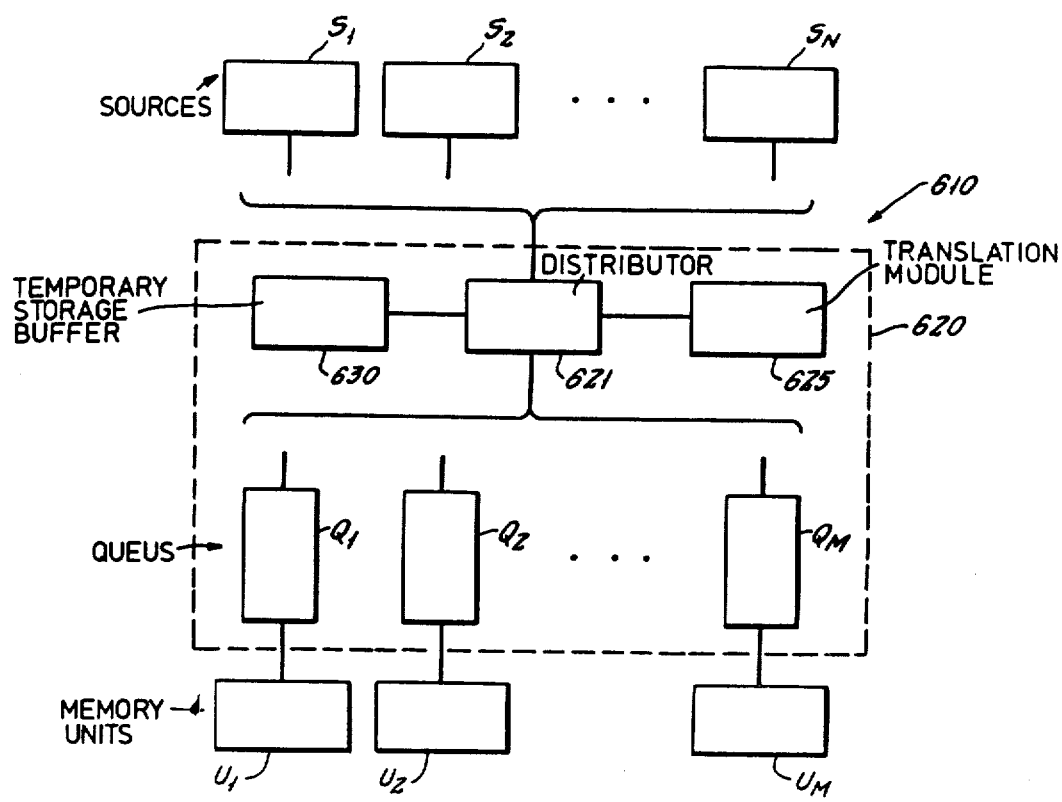
FIG. 6 is a block diagram of a second embodiment of our invention.

FIG. 6 shows a second embodiment of our invention, comprising a computer system 610 similar to system 410 of FIG. 4 with the addition of a temporary storage buffer 630, which is a conflict control mechanism for READ and TEST references. This is a memory associated with the memory manager 620 of the computer system 610. READ and TEST references are subject to no restrictions when a temporary storage buffer is employed in accordance with our invention. This absence of restrictions, for example, permits all of the sources $S_1-S_N$ to keep reading the same reference address.

In the following initial description, several aspects of the temporary storage buffer 630 are all employed. Variations, which also provide conflict free performance, are noted below.

Every time a copy of a data item is read out of one of the memory units $U_1-U_M$, a copy is stored in the temporary storage buffer 630.

Whenever the memory manager 620 receives a READ reference, it first consults the temporary storage buffer 630 to find whether the item is stored in the temporary storage buffer 630. If so the reference request is satisfied from the temporary storage buffer 630, and therefore that request will never be directed to any of the memory units $U_1-U_M$, will never appear in any of the memory unit queues $Q_1-Q_M$ and will not contribute to memory accesses. Therefore, the Opponent seeking to defeat the system will never made any reference request for an item that is already stored in the temporary storage buffer.

In the last paragraph, we assumed that the temporary storage buffer 630 will contain a copy of the data item the instant an access request request has been made. In fact, an access may wait in one of the memory queues $Q_1-Q_M$, for some time before the data item is actually delivered back to the memory manager 620. Since the assumption of instantaneous memory reference cannot be made in most real systems, we store in the temporary storage buffer 630 not only copies of recently used data items, but also access requests to the memory units $U_1-U_M$ which have been made, but have not yet been satisifed.

As each READ request for an item arrives in the memory manager 620, for example from source $S_2$, it is compared with all items currently stored in the temporary storage buffer 630.

(a) If a copy of the requested item is in the temporary storage buffer 630, a copy is sent to the requesting source $S_2$;

(b) if another READ request for the item is in the temporary storage buffer 630, the latter request is also stored in the temporary storage buffer 630, but no access is made to any of the memory units $U_1-U_M$; and (c) if neither (a) nor (b) occurs, then the request is stored in the temporary storage buffer 630, and both this request and the actual address obtained from the translation module 625 is put into the proper one of the queues $Q_1$-$Q_M$ for the one of the actual memory units $U_1$-$U_M$ to be accessed by the request.

When one of the memory units $U_1$-$U_M$ delivers a copy of a data item that has been read, all READ requests for that item existing in the temporary storage buffer 630 are satisfied by sending the item to all sources that requested it. All these requests are then deleted from the temporary storage buffer 630; however, a copy of the data item itself is stored in the temporary storage buffer 630. This mechanism assures that no more than one access request for a given data item can be directed to the memory unit containing it at any time.

TEST requests are not satisfied from a copy of the item in the temporary storage buffer. If another TEST request for the item is in the temporary storage buffer, this request is also stored in the temporary storage buffer and no access is made to any of the memory units $U_1$-$U_M$. If there is no other TEST request for this item in the temporary storage buffer, this request is stored in the temporary storage buffer and it, together with the actual address obtained from the translation module 625, is put into the queue for the actual memory unit to be accessed by this request.

When a TEST access is serviced by a memory unit, the memory unit returns status information and possibly a copy of the item to the memory management system. This response to the TEST access is designated to be sent on to a particular source by the memory manager 620. Other sources of TEST requests to the same items that have been stored in the temporary storage buffer are sent status information representing failure. If a copy of the item was returned by the memory unit this copy is also sent to these other sources.

Note that if the temporary storage buffer 630 is full, an incoming READ or TEST request may only replace an old item. The choice of the old item can be made by any of various replacement algorithms.

In the previous embodiment, if the probability of failure from WRITE requests was to be at least as low as $\eta$, then $N_\eta$ or more different sources would be needed. Now suppose that the temporary storage buffer has storage space for just $N_\eta - 1$ data items. If the Opponent repeats a READ reference without having $N_\eta - 1$ other requests intervening, a copy of the data item will still be in the temporary storage buffer 630. Therefore, the Opponent is forced (in order to create memory accesses) to plan the referencing patterns so that at least $N_\eta$ different references are made. As previously described, the virtual or symbolic addresses of these references have been translated at random into actual addresses. As a result of the use of our temporary storage buffer, the pattern of READ and TEST accesses to the memory system is that no access for any item is made more often than once every $N_\eta$ total accesses to the memory system.

The Opponent can circumvent the temporary storage buffer completely by adopting a policy of never referencing anything in the temporary storage buffer 630. This he can do by spreading his references among at least $N_\eta$ different data items. The memory units $U_1$-$U_M$ will always be accessed, but as though there were $N_\eta$ distinct referencing sources, each required (by virtue of the Opponent's policy) to reference a different item. Then, by the same statistical arguments which we have applied to WRITE requests in the previous embodiment, the probability that the Opponent can defeat the system will be $\eta$. Thus, the reference pattern necessary to circumvent the temporary storage buffer 630 must produce satisfactory behavior by the memory system as a whole.

We contrast the performance of the temporary storage buffer of our invention with the conventional and well known uses of cache memory in computer systems. In the ordinary usage of a cache memory, the system performance is improved whenever some recently used item is again requested and found in the conventional cache. If an item is not found in the conventional cache, no benefit is obtained from the presence of the cache. Whether or not a conventional cache will benefit the memory system with which it is associated depends upon whether or not the pattern of memory access requests contains repetitions. "Unfavorable" request patterns (those containing no repetitions) will negate the benefit of a conventional cache. In contrast, the use of the temporary storage buffer in combination with the randomization of the actual locations of data items in the memory units, according to our invention, provides conflict free performance under every request pattern. This performance, moreover, can be achieved even if a "unfavorable" referencing pattern assures that no data item is ever found in the temporary storage buffer.

The optimal size of the temporary storage buffer is determined by factors relating to $N_\eta$ the numbers of memory units in the system and the desired level of performance. Cn the other hand, the size of a conventional cache is determined (as has been reported in the literature) in accordance with the statistics of behavior of "typical programs" and the optimal size of conventional cache will be application dependent.

Finally, the contents of our temporary storage buffer may consist of recently accessed data items, or only of pending reference requests or of both. In all of these cases, a conflict free memory system will result, provided (as previously pointed out) that a suitable randomized distribution of data items among the memory units has been achieved. Of course, we do not exclude the obvious possibility that a memory can be used for a conventional cache function in addition to its use as the temporary storage buffer in connection with the conflict control mechanisms of our invention.

Figure 7:
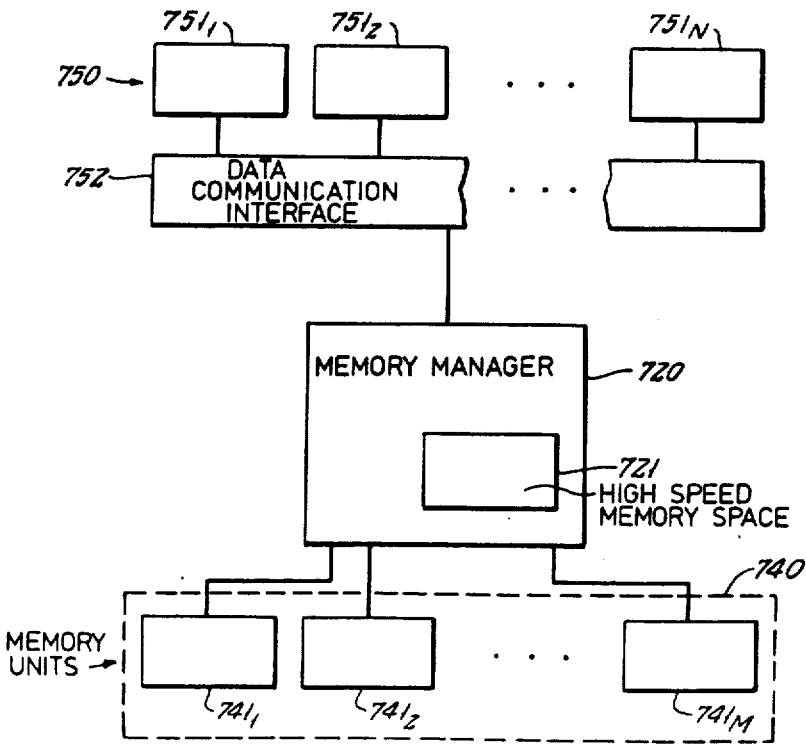
FIG. 7 is a block diagram of a third embodiment of our invention.

FIG. 7 shows a third embodiment of our invention, comprising a computer system 710 including a memory manager 720 in the form of a general or special purpose computer. Connected to it is a memory, 740 which consists of a multiplicity of actual memory units such as disks, drums, charge coupled devices, bubbles, tapes, etc., together with the special or general purpose mechanisms necessary for control of access to them. Each separate item exists in one and only one actual memory unit within the memory system 740. There are many items in each actual memory unit $741_1$-$741_M$. The sources 750 in this embodiment are terminals which can be keyboard devices, cathode ray tube devices, other computers, etc. The sources may be local or geographically remote, and may be connected to the general or special purpose computer comprising the memory manager 720 via a data communication interface 752.

Figure 8:
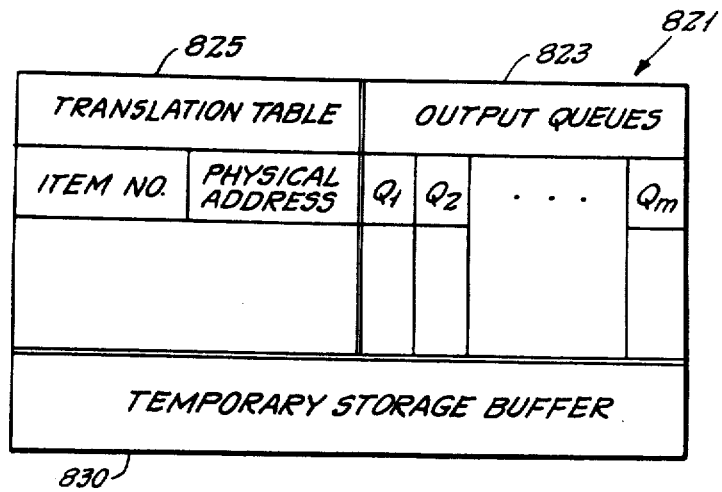
FIG. 8 is a diagram of a memory allocation for the third embodiment of our invention.

An allocation of high speed memory space 721 in the memory manager 720 is shown in FIG. 8. This high speed memory space 821 (corresponding to memory space 721 in FIG. 7) is allocated to the conflict free memory control. Associated with each data item in the system is an item number. Space 825 is the space reserved to hold the translation module, which holds a list of item numbers and the associated actual address within one of the memory units $741_1$–$741_M$ in which the item resides. These actual addresses were generated by a randomizing procedure. Space 823 is the space reserved for the collection of queues of access requests, indicated here as one queue for each of the memory units $741_1$–$741_M$. The requests in these queues are managed by the general or special purpose computer's queue management system. Space 830 is the space reserved for the temporary storage buffer.

In one variation of this embodiment, only READ and TEST requests are stored in the temporary storage buffer, but not a copy of the requested item. This variation—including the translation module 825 and randomized memory locations—also provides a conflict free memory system.

In a second variation of the embodiment, READ requests are not stored in the temporary storage buffer 830, but copies of items are stored there. This variation—including the translation module 825 and randomized memory locations—also provides a conflict-free memory system.

In another variation of this embodiment, copies of data items of WRITE requests for a simple store operation and READ requests are stored in the temporary storage buffer 830. Any READ requests for WRITE request items in the temporary storage buffer 830 are satisfied immediately from the temporary storage buffer 830 using the WRITE request item information. If there is no space for a new WRITE request, an old WRITE request is deleted. The choice of the old WRITE request to be deleted and replaced can be made by any of the various replacement algorithms Alternatively, the data items from WRITE requests or data items in the temporary storage buffer from previous READ requests can be treated indifferently for the purposes of replacement.

In another variation of this embodiment, relating to the storage of WRITE requests, the temporary storage buffer allows a WRITE completion signal from the queue management system to cause deletion of the write request.

The previous discussions assume that the memory manager (and the temporary storage buffer as well) is much faster than the memory system so that the memory unit service time governs the performance of the system. This is, in at least some cases, a reasonable model for a computer system with disk files and a high speed computer. We now consider systems in which there are so many memory units or the memory units function at such high speed, that the memory manager functions must be carried out in some parallel manner. The analysis above, however, will still apply.

Figure 9:
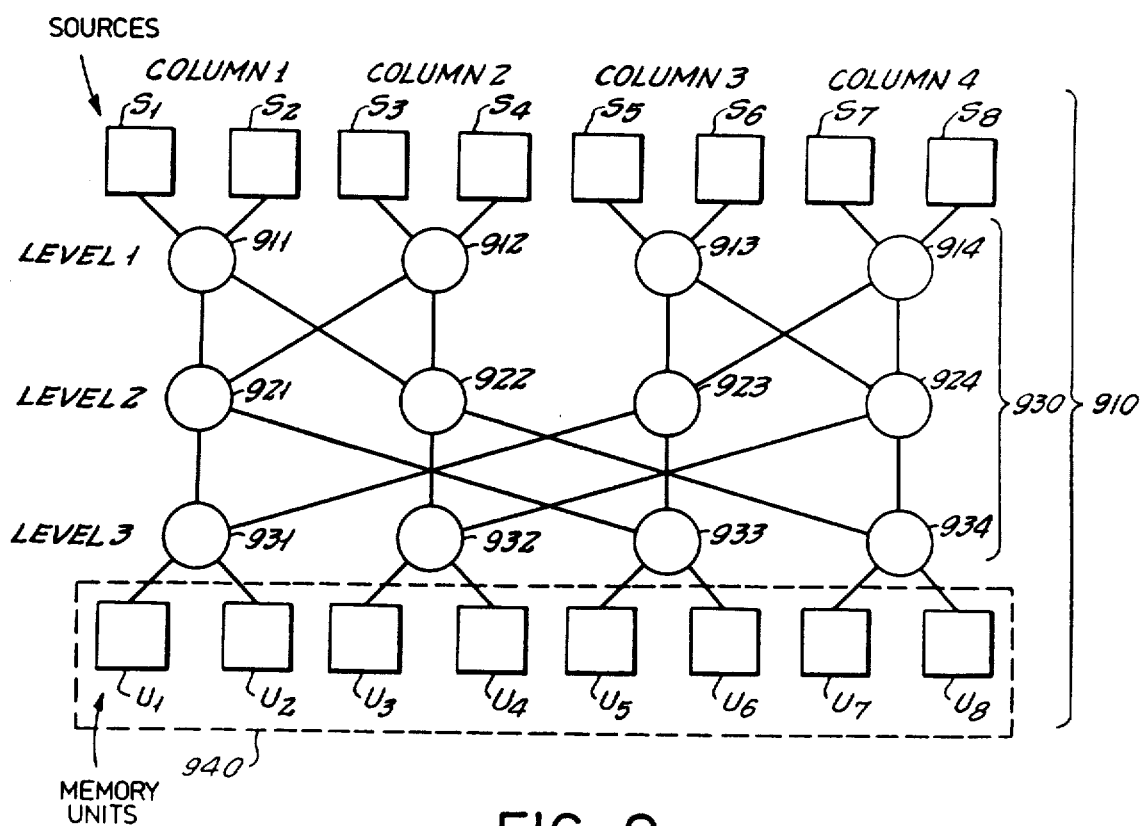
FIG. 9 is a block diagram of a fourth embodiment of our invention.

A fourth embodiment of our invention, a computer system 910 shown in FIG. 9, includes a plurality of sources $S_1$–$S_8$ and a plurality a memory units $U_1$–$U_8$.

This embodiment is especially useful where the sources $S_1$–$S_8$ are general or special purpose computers or processors. The memory manager 930 in this embodiment consists of a multistage switching interconnection network of nodes 911–914, 921–924 and 931–934 each including a switch element and a temporary storage buffer as described below.

Although FIG. 9 shows 8 sources, 8 memory units and 12 nodes; as will be apparent from the following discussion and this specification as a whole, our invention is not limited to that particular combination, or to a one-to-one relationship between sources and memory units, or to four communications links per node For example, the two sources in each column of FIG. 9 could be replaced by a single source having a multiplicity of register sets or by a plurality of sources. Alternative network topologies to that of the interconnection network comprising the memory manager 930 of FIG. 9 can be selected by one skilled in the art from the network topologies described or implied, for example, in the book by V. E. Benes "Mathematical Theory of Connecting Networks and Telephone Traffic", Academic Press, 1965, New York; the paper by K. E. Batcher "Sorting Networks and Their Applications: 1968 Spring Joint Computer Conference, AFIPS Proc. Vol. 32 pp. 307-314; D. H. Lawrie, "Memory Processor Connection Networks," Dept of Computer Science, Univ. of Illinois, Urbana, Ill. Report 557, 1973; A. Waksman, "A Permutation Network", Journal of the Association for Computing Machinery, Vol. 15, pp. 159-163, 1968; Opferman and Tsao, "On a Class of Rearrangeable Switching Networks" Bell System Technical Journal, V. 50, p.5, May, June 1971, pp. 1579-1600; and certain cases of the networks of L. R. Goke, G. J. Lipovski "Banyan Networks for Partitioning Multiprocessor Systems; Proc. 1st Annual Computer Architecture Conference, Gainsville, Fla., 1973, pp. 21-28.

The interconnection network of nodes comprising the memory manager 930 shown in FIG. 9 is called a binary switching tree. The number of levels of nodes is k where $2^k$ equals the number N of sources $S_1$–$S_8$ which also equals the number M of memory units $U_1$–$U_8$. Here, k=3 because M=N=8. The number of nodes in each column is also k. Each level contains N/2 nodes. The nodes at any level always have one connection directly down to another node in the same column. For example, node 911 connects with node 921. The other connection for each node is made in accordance with Table I below:

TABLE I

| Column No. | 1 | 2 | 3 | 4 |
|---|---|---|---|---|
| Level 1 | R | L | R | L |
| Level 2 | R | R | L | L |

An R in Table I means the connection goes to a node to the right on the next lower level as shown in FIG. 9. An L in Table I means that the connection goes to a node to the left on the next lower level of FIG. 9. More generally, if the Table I symbol is an R, the column to which the connection is made is given by the formula: $C+2^{x-1}$, when C is the column number and x is the level number of the node from which the connection is made. If the Table I symbol is an L, the column to which the connection is made is given by the formula: $C-2^{x-1}$.

For a binary switching tree interconnection network of twice the size of that of FIG. 9, i.e. 16 sources, 16 memories and 4 levels; Table I is simply duplicated and a row added with all R's in the left half of this row and L's in the right half of this row, as shown in Table II:

TABLE II

| Column No. | 1 | 2 | 3 | 4 | 5 | 6 | 7 | 8 |
|---|---|---|---|---|---|---|---|---|
| Level 1 | R | L | R | L | R | L | R | L |
| Level 2 | R | R | L | L | R | R | L | L |
| Level 3 | R | R | R | R | L | L | L | L |

Duplicating Table II and adding another such row, will give a connection table for a network having 32 sources and 32 memory units etc.

More precisely, we can characterize the rule for the inter-node connections of binary switching trees as follows: If a node location is denoted by (x,C), then each node connects to the node at position (x+1,C) and to the node at $(x+1, C+2^{x-1})$ if $(C-1)$ mod $(2^x) < 2^{x-1}$, otherwise to (x+1, C) and to $(x+1, C-2^{x-1})$.

The connections between nodes in FIG. 9 and between nodes and sources, and between nodes and memory units represent two way communication links. These links can be wires, radio channels, microwave channels, optical fibers, satellite channels or any other transmission channels of adequate bandwidth in bits per second.

The memory system 940 consists of a multiplicity of actual memory units $U_1$-$U_8$ employing any of several storage techniques such as such as cores, semiconductors, Josephson junctions, bubbles, charge coupled devices, etc. The memory system 940 holds a data base. Each separate item need exist in one and only one of the memory units $U_1$-$U_8$ and there are many items in each of the memory units $U_1$-$U_8$.

Associated with each item is an item number. Items are stored in the memory units $U_1$-$U_8$ in accordance with the actual address associated with the item's item number. These actual addresses are generated by a randomizing procedure or device and stored with the item number in a translation module, such as the one shown in FIG. 8. In one variation of this embodiment, a copy of the translation module resides in the local memory of each of the sources $S_1$-$S_8$.

Each of the sources $S_1$-$S_8$ accesses the required memory unit by first looking up the item number in a translation module to obtain the actual address for the memory unit containing the data item. A source address is also associated with each of the sources $S_1$-$S_8$. Each access request takes the form of a packet which is transmitted through the memory manager 930 to and from the proper memory unit.

Each packet is a collection of bits divided into fields. One field contains an operation code which specifies the type of request, e.g., READ or WRITE. A second field contains the source or source address. A third field contains the memory unit address. A fourth field contains the item address, which is the actual address of an item within the memory unit. Together, the memory unit address and the item address comprise the destination address. A fifth field containing the actual item is added where appropriate. Note that the packets may be of variable length.

Typically, the computer system 910 operates as follows. When a source, such as source $S_4$ desires to access a data item, for example, a data item in memory unit $U_8$, the source $S_4$ sends a packet on a link to the first level node 912 to which it is connected. At this node 912, the packet is processed, as described below. If necessary, the packet is sent on a link to a node 922 the next level of switching which in turn processes the packet. If necessary, the packet is sent on a link to node 934, where it is processed and, if necessary forwarded to the memory unit $U_8$. If the packet arrives at the memory unit $U_8$, the packet is again processed and a return packet is sent back to the requesting source $S_4$ via the nodes 934, 922 & 912 as described above.

Figure 10:
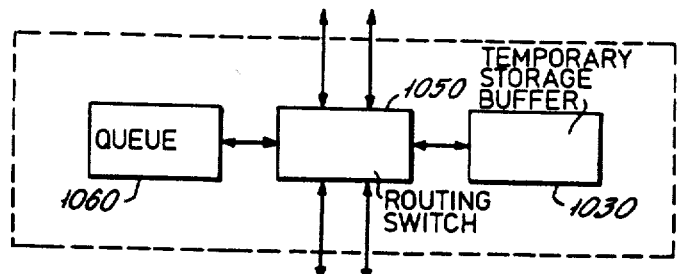
FIG. 10 is a block diagram of a typical node useful for the fourth embodiment of our invention.

A typical node of FIG. 9 is shown in more detail in FIG. 10. Each node 1010 contains one temporary storage buffer 1030, a routing switch 1050 and a queue 1060.

As each READ request packet from a source for an item arrives at routing switch 1050, the packet's destination address is compared with the addresses currently stored in the temporary storage buffer 1030. If the address associated with an item in the temporary storage buffer 1030 matches the destination address of the packet, the item is copied into the data field of the packet and the packet is routed for return to the requesting source by the routing switch 1050, which places it in the queue 1060 marked for transmission to the same. If the destination address is in the temporary storage buffer 1030 but the associated item is not there (because a READ request is pending), the request packet also is stored in the temporary storage buffer 1030.

If the destination address is not in the temporary storage buffer 1030, the packet is stored in the temporary storage buffer 1030. In addition, the routing switch 1050 places the packet in the queue 1060, to transmit the packet to the destination address.

As each TEST request packet for an item arrives at routing switch 1050, a copy of the TEST request packet is stored in the temporary storage buffer 1030. If another TEST request packet for the item is not stored in the temporary storage buffer 1030, then the routing switch 1050 places the packet in the queue 1060, to transmit the packet toward the destination address. Note that a TEST access is never satisfied by a copy of an item stored in the temporary storage buffer 1030.

When the operation code of a packet indicates a WRITE request, the routing switch 1050 puts the packet in the queue 1060 for transmission to the appropriate memory unit. In one variation of this embodiment, the data items from WRITE requests are also placed in the temporary storage buffer.

When a READ response packet arrives at routing switch 1050 of a node 1010, the data item contained therein is placed in all response request packets in the temporary storage buffer 1030 at that node having the same destination address. Each of these packets is then removed from the temporary storage buffer 1030 and put in the queue 1060 in order to send the item to each of the requesting sources. A copy of item and its destination address are retained in the temporary storage buffer 1030.

When a return packet from a TEST request arrives at routing switch 1050, it is enroute to a particular requesting source. The routing switch 1050, therefore, places the packet in the queue 1060 to move the packet toward that source, forwarding the packet without modification. For the other TEST requests to the same item, which have been stored in the temporary storage buffer 1030, the node 1010 generates additional response packets containing status information indicating that the test failed and transmits them to the requesting sources. In addition, if the TEST response packet arriving at node 1010 from a memory unit contains a copy of the item, these additional packets generated at the node 1010 also contain a copy of the item.

An incoming request packet which is to be stored in the temporary storage buffer 1030 will only replace an old item if the temporary storage buffer 1030 is full. The choice of the old item to be replaced can be made by any of the various known replacement algorithms.

Figure 11:
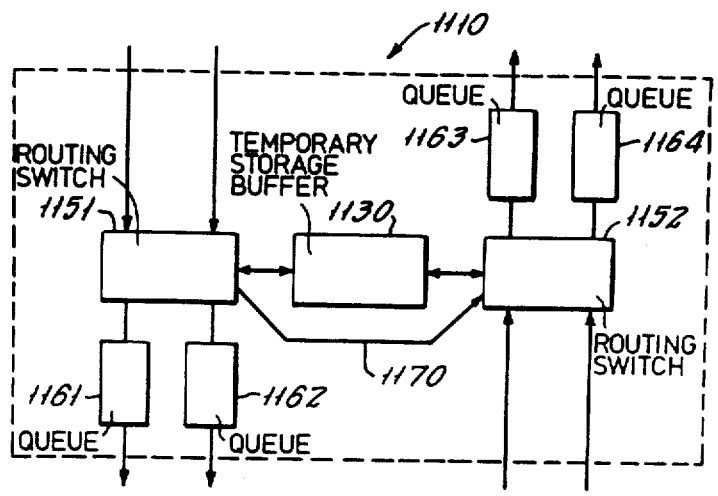
FIG. 11 is a block diagram of another typical node useful for the fourth embodiment of our invention.

FIG. 11 shows an alternative node 1110 suitable for use in the embodiment of FIG. 9. Node 1110 comprises two routing switches 1151 and 1152, a shared temporary storage buffer 1130, separate queues 1161 and 1162 for each communication link directed toward the memory units, separate queues 1163 and 1164 for each communications link directed toward the sources, and a communcations line 1170 between the routing switches 1151 and 1152. The operation of node 1110 should be clear to those skilled in the art from the description of the operation of node 1010 above.

Figure 12:
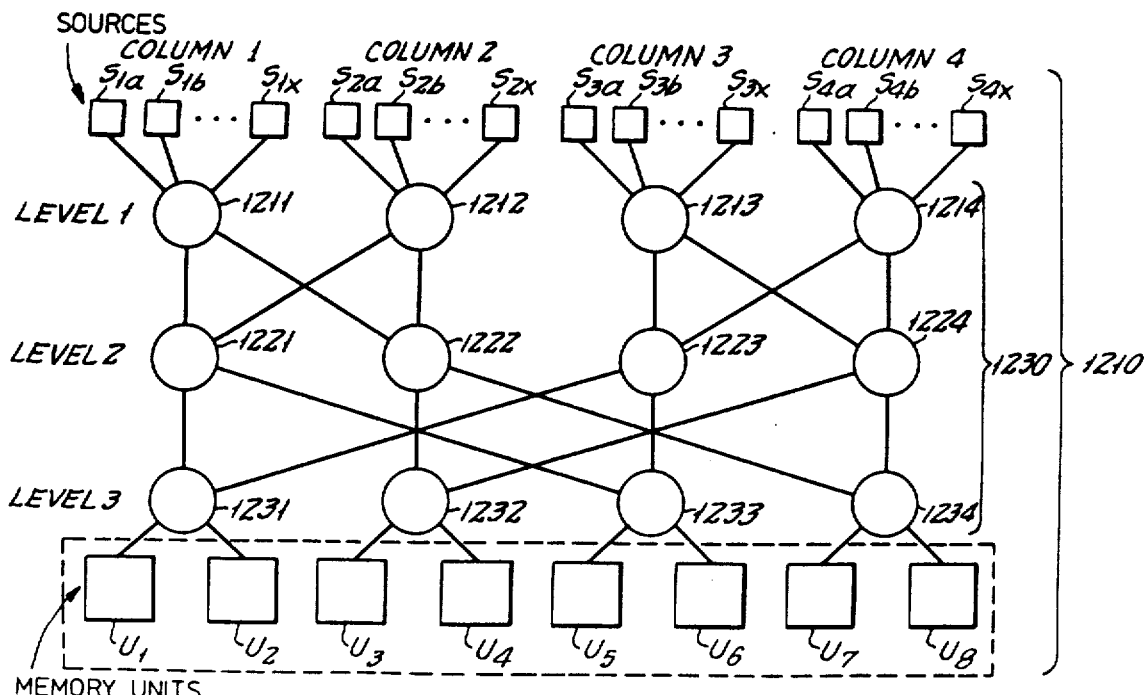
FIG. 12 is a block diagram of variation of the fourth embodiment of our invention, having numerous sources connected to each input node.

Any packet moving from a source via the network to a memory unit will be delayed. This delay is called latency. Similar latencies occur in any computer system. If each source waits for a response packet before generating a new request packet, the system, including the network of FIG. 9, the memory units and the sources, may be underutilized. Therefore, a source can generate a multiplicity of request packets in this system without waiting for the corresponding response packets. Consequently, a variation of this embodiment replaces the two sources in each column of FIG. 9 with a multiplicity of sources $S_{1a}$–$S_{1x}$, $S_{2a}$–$S_{2x}$, $S_{3a}$–$S_{3x}$ & $S_{4a}$–$S_{4x}$, as shown in FIG. 12.

In another variation of this embodiment, only READ requests are stored in the temporary storage buffer, but not a copy of the requested item. This variation—including the translation module and randomized memory locations—also serves to enable a conflict-free memory system.

In another variation, READ requests are not stored in the temporary storage buffer, but copies of items are stored. This variation—including the translation module and randomized memory locations—also serves to enable a conflict-free memory.

In another variation of this embodiment, copies of data items of WRITE requests for a simple store operation and READ requests are stored in the temporary storage buffer. Any READ requests for WRITE request items in the temporary storage buffer are satisfied immediately from the temporary storage buffer using the WRITE request item information. If there is no space for a new WRITE request, an old WRITE request is deleted. The choice of the old WRITE request to be deleted and replaced can be made by any of the various replacement algorithms. Alternatively, the data items from WRITE requests or data items in the temporary storage buffer from previous READ requests can be treated indifferently for the purposes of replacement.

Another variation relating to the storage of WRITE requests in the temporary storage buffer allows a WRITE response packet from the memory unit to cause deletion of the write request.

Another variation replaces the translation module existing at each source with a single translation module stored in the memory system. In this variation the translation module consists of items. Each of these items contains a multiplicity of the entries from the translation module. (Each entry, as previously noted, contains an item number and a corresponding actual address). In this variation therefore each source will store in its local memory a new translation module for the translation module in the memory system. This procedure can now be continued until each source need hold only a single entry in its local memory translation module.

Further embodiments can be obtained by appropriate rearrangement of systems of the type shown in FIG. 9.

If the devices in each column of FIG. 9 are considered simply to be part of a single one of the network modules 1-4, then we can redraw them as in FIG. 13 with each network module 1-4 still containing the sources S, nodes N and memory units U. The system of FIG. 13 can be depicted, more generally, in the form of FIG. 14. We can rearrange FIG. 14 into a square, as shown in FIG. 15. This square can also be called a binary k-cube, for k=2. For a network with twice the number of network modules, k=3, the network of FIG. 15 is replicated with the addition of network modules 1'-4' and a connection is made from a network module in each one of the 2-cubes to the corresponding network module in the other 2-cube. Note that this procedure is equivalent to the procedure followed in going from Table I to Table II. This procedure leads to the network of FIG. 16 which has $2^3 = 8$ network modules. If looked at in perspective, it also clearly represents an ordinary cube in 3 dimensions, which is a commonly used model of a binary 3-cube. This procedure can be continued indefinitely to obtain a binary cube for any value of k.

Referring again to FIG. 9, we note that in each column, called a network module in FIGS. 13-16, are sources, nodes, and memory units, which are connected within each of the network modules 1-4 in a specific manner. In the binary k-cube embodiments, we may interconnect the sources, nodes and memory units within a module in any useful way and are not constrained to use the interconnections of FIG. 9. In fact, although each type of unit (sources, nodes and memory units) must be present in each network module, the number of such units and manner of interconnections within the modules are not constrained to those of FIG. 9. For example, FIG. 17 shows a binary 2 cube, each of the network modules 1701-1704 of which comprises one source S, one memory unit U and 2 nodes N connected by a bus. The bus replaces some of the links used previously and can consist of physical elements identical to those of the links. FIG. 18 shows a binary 2-cube in which each of the network modules 1801-1804 each comprise one source S, one memory unit U and two nodes N all of which are connected by a crossbar structure. In FIG. 19, the same elements as in FIGS. 17 and 18 are connected within each of the network modules 1901-1904 by a ring structure.

In lieu of further specific examples, FIG. 20 shows the use of generic network modules 2001-2004, each comprising a source or processor S, a memory unit U and a node N. This structure also adheres to the conflict free control, provided that the network interface contains suitable routing mechanisms, a temporary storage buffer and output queues as previously described.

It is to be understood that the embodiments and variations shown and described herein are illustrative of the principles of this invention only and that various modifications may be implemented by those skilled in the art without departing from the scope and spirit of the invention.

We claim:

1. A system for effecting communication between a plurality of sources generating READ requests for access to stored information and plurality of memory units for containing said information and generating READ replies containing same, said system comprising:
   (a) a multi-level network of nodes, said network including first level nodes, each such first level node being connected to plural ones of said sources for receiving said READ requests, second level nodes, each such second level node being connected to plural ones of said memory units for accessing same to receive READ replies to said READ requests and at least one further level of nodes, each such further level node interconnecting plural ones of said first level nodes to plural ones to said second level nodes to convey said READ requests and READ replies therebetween;

(b) storage means at each such node for containing indicia of said READ requests; and (c) distributor means at each such node connected to said storage means of said node for determining whether an indicia of a READ request received at said node (1) is contained or (2) is not contained in said storage means, said distributor means both permitting conveyance of a received such READ request through said node and storing an indicia of that READ request in said storage means upon such determination (2) therefor and denying conveyance of a received such READ request through said node upon each such determination (1) therefor, said distributor means also forwarding READ replies to all sources requesting same.

2. A system for effecting communication between a plurality of sources generating READ requests for access to stored items and plurality of memory units for containing said items and generating READ replies containing same, said sources further generating WRITE requests to enter items in said memory units, said system comprising:

(a) a multi-level network of nodes, said network including first level nodes, each such first level node being connected to plural ones of said sources for receiving said READ requests and said WRITE requests, second level nodes, each such second level node being connected to plural ones of said memory units for accessing same to receive READ replies to said READ requests and at least one further level of nodes, each such further level node interconnecting plural ones of said first level nodes to plural ones of said second level nodes to convey said READ requests and said WRITE requests and said READ replies therebetween;

(b) storage means at each such node for containing indicia of said READ requests;

(c) means connected with each said source and operative to select memory unit locations for WRITE requests at random or pseudo-random; and (d) distributor means at each such node connected to said storage means of said node for determining whether an indicia of a READ request received at said node (1) is contained or (2) is not contained in said storage means, said distributor means both permitting conveyance of a received such READ request through said node and storing an indicia of that READ request in said storage means upon such determination (2) therefor and denying conveyance of a received such READ request through said node upon each such determination (1) therefor, said distributor means also forwarding READ replies to all sources requesting same.

3. The invention claimed in claim 2 wherein said distributor means is further operative to place READ replies in said storage means, whereby subsequent READ requests for the same information are replied to by said distributor means without access to said memory units.

4. The invention claimed in claim 3 wherein said distributor means is further operative to place said WRITE requests in said storage means concurrently with forwarding same enroute to the memory unit location thereof.

5. The invention claimed in claim 4 wherein said distributor means is further operative to reply, to a READ request having a memory unit location corresponding with that of a stored WRITE request, without access to said memory units.

6. The invention claimed in claim 4 wherein said storage means is operative to delete therefrom stored WRITE requests upon writing thereof in a memory unit.

7. The invention claimed in claim 4 wherein said sources further generate TEST requests to test items stored in said memory units and wherein said distributor means is further operative upon receipt of a TEST request for a given memory unit location, if no indicia thereof is stored in said storage means, both to store an indicia of said TEST request in said storage means and to forward said TEST request enroute to said given memory unit location.

8. The invention claimed in claim 4 wherein said distributor means is further operative upon receipt of a TEST request, having an indicia stored in said storage means, to store such received TEST request and not forward said received TEST request enroute to said given memory unit location.

9. The invention claimed in claim 8 wherein said distributor means is further operative upon receipt of a memory unit reply to furnish an informative response to the source first making the TEST request and to furnish a response to each other source making the TEST request indicative of failure of such TEST request.

10. The invention claimed in claim 9 wherein said informative response includes indication as to success or failure of the TEST request.

11. The invention claimed in claim 10 wherein said informative response is further inclusive of a copy of the item subject to the TEST request.

12. The invention claimed in claim 2 wherein said indicia contained in said storage means are indicia of memory unit locations in said READ requests.

13. The invention claimed in claim 2 wherein said distributor means is further operative to place said WRITE requests in said storage means concurrently with forwarding same enroute to the memory unit location thereof.

14. The invention claimed in claim 13 wherein said distributor means is further operative to reply, to a READ request having a memory unit location corresponding with that of a stored WRITE request, without access to said memory units.

15. The invention claimed in claim 13 wherein said storage means is operative to delete therefrom stored WRITE requests upon writing thereof in a memory unit.

16. The invention claimed in claim 2 wherein said sources further generate TEST requests to test items stored in said memory units and wherein said distributor means is further operative upon receipt of a TEST request for a given memory unit location, if no indicia thereof is stored in said storage means, both to store an indicia of said TEST request in said storage means and to forward said TEST request enroute to said given memory unit location.

17. The invention claimed in claim 16 wherein said distributor means is further operative upon receipt of TEST request, having an indicia stored in said storage means, to store such received TEST request and not forward said received TEST request enroute to said given memory unit location.

18. The invention claimed in claim 17 wherein said distributor means is further operative upon receipt of a memory unit reply to furnish an informative response to the source first making the TEST request and to furnish a response to each other source making the TEST request indicative of failure of such TEST request.

19. The invention claimed in claim 18 wherein said informative response includes indication as to success or failure of the TEST request.

20. The invention claimed in claim 19 wherein said informative response is further inclusive of a copy of the item subject to the TEST request.

21. A system for effecting communication between a plurality of sources generating READ requests for access to stored items and a plurality of memory units for containing said items and generating READ replies containing same, said sources further generating WRITE requests to enter items in said memory units, said system comprising:

(a) a multi-level network of nodes, said network including first level nodes, each such first level node being connected to plural ones of said sources for receiving said requests, second level nodes, each such second level node being connected to plural ones of said memory units for accessing same to receive replies to said requests and at least one further level of nodes, each such further level node interconnecting plural ones of said first level nodes to plural ones of said second level nodes to convey said READ requests, said WRITE requests and said READ replies therebetween;

(b) storage means at each such node for containing indicia of said READ requests; and (c) distributor means at each such node connected to said storage means and operative for conveyance through said node of received READ requests and received WRITE requests, said distributor means determining whether an indicia of a READ request received at said node (1) is contained or (2) is not contained in said storage means, said distributor means both permitting conveyance of a received such READ request through said node and storing an indicia of that READ request in said storage means upon such determination (2) therefor and denying conveyance of a received such READ request through said node upon each such determination (1) therefor, WRITE requests conveyance through said node being unconditional, said distributor means also forwarding READ replies in common to all sources requesting same.

22. The invention claimed in claim 21 wherein said storage means further contains indicia of said WRITE requests and wherein said READ replies are provided without memory unit access (1) where the READ request therefor has indicia stored in said storage means or (2) where the READ request therefor has memory unit location indicia corresponding with that of a WRITE request stored in said storage means.

23. The system claimed in claim 21 wherein said sources further generate TEST requests to test items stored in said memory units and wherein said storage means is further operative for containing indicia of said TEST requests, said distributor means being further operative for conveyance therethrough of received TEST requests dependently upon the content of said storage means.

* * * * *